United States Patent [19]

Takatsuki et al.

[11] 4,366,347

[45] Dec. 28, 1982

[54] APPARATUS FOR SELECTING TERMINAL EQUIPMENT IN TELEPHONE LINES

[75] Inventors: Toshiharu Takatsuki, Tokyo; Ken-ichi Fujiwara, Amagasaki; Jutaro Nomura, Amagasaki; Shigeru Okamura, Amagasaki, all of Japan

[73] Assignees: Mitsubishi Denki Kabushiki Kaisha; Nippon Telegraph and Telephone Public Corp., both of Tokyo, Japan

[21] Appl. No.: 85,683

[22] Filed: Oct. 17, 1979

[30] Foreign Application Priority Data

Oct. 20, 1978 [JP]  Japan ................. 53-129078

[51] Int. Cl.³ .......................... H04M 11/06
[52] U.S. Cl. .................. 179/2 DP; 179/84 R
[58] Field of Search ............... 179/2 AM, 2 R, 2 A, 179/2 DP, 3, 84 R; 340/150, 151

[56] References Cited

U.S. PATENT DOCUMENTS 3,414,676 12/1968 Long ........................ 179/2 AM
3,941,939  3/1976 Holmes et al. ............ 179/84 R
4,022,977  5/1977 Nomura ................... 179/2 AM

OTHER PUBLICATIONS

"Days of Decision are Here for Utility Remote Meter Reading", by Richard Martin, Pipeline and Gas Journal, Apr. 1972, pp. 23-28.

Primary Examiner—Bernard Konick
Assistant Examiner—J. A. Popek
Attorney, Agent, or Firm—Oblon, Fisher, Spivak, McClelland & Maier

[57] ABSTRACT

An exchange center is connected to telephone lines and a telephone and a data transmitter as terminal equipment are connected to the telephone lines. The data transmitter is actuated depending upon the polarity of DC voltage applied to the telephone lines. The telephone line is potentially opened by detecting the current of the telephone during the operation of the data transmitter. The impedance of the telephone line during the opening state is detected whereby the operation of the data transmitter is stopped by inverting the DC voltage applied to the telephone line and the telephone is predominantly communicated through the exchange center over the data transmitter.

4 Claims, 2 Drawing Figures

APPARATUS FOR SELECTING TERMINAL EQUIPMENT IN TELEPHONE LINES

BACKGROUND OF THE INVENTION

1. FIELD OF THE INVENTION

The present invention relates to an apparatus for selecting terminal equipment connected to telephone lines by detecting the line impedance at an exchange center so as to select either a telephone or a data transmitter at the terminal.

2. DESCRIPTION OF THE PRIOR ARTS

A simple apparatus which performs satisfactorily has not been found. It has been proposed to provide the circuit shown in FIG. 1 which has a device for measuring the line loop impedance in a telephone line which is equipped at the exchange center to detect a variation of line loop impedances by the off-hook operation of the telephone.

In FIG. 1, the terminal device comprises a network control unit (1) (hereinafter referring to as NCU); a data terminal equipment (2) (hereinafter referring to DTE) and a telephone (3). The exchange center comprises a station power source (4); a relay contact (5) for inversion of the line; a reference resistance (6) for measuring a line loop resistance and a control circuit having an analogue-digital converter (7).

The selection of either the telephone (3) or the data terminal equipment (2) is carried out by switching the relay contact (5) for inversion of the line. In FIG. 1, the telephone (3) is selected. When the relay contact (5) is switched, the positive potential is applied in the line $L_2$ whereby a diode $D_1$ of NCU (1) is turned on to connect the power source to NCU (1) and DTE (2) so as to make NCU (1) and DTE (2) operable. The telephone (3) can not be used when DTE (2) is used whereas DTE (2) can not be used when the telephone is used. In the apparatus shown in FIG. 1, the telephone (3) is predominantly selected. When the hook switch H·S is closed by removing the telephone (3) from its hook during the period of data transmission through the lines $L_1$, $L_2$ by DTE (2), current is passed through the telephone (3). The telephone current is detected by a control circuit (8) at the exchange center and the telephone (3) is selected by switching the relay switch (5). The relay switch (5) selects the telephone (3) or DTE (2) by inverting DC voltage applied through the lines $L_1$, $L_2$.

The operation for predominantly selecting the telephone (3) over DTE (2) will be illustrated.

The situation where NCU (1) at the terminal is actuated to operate DTE (2) and a modulator-demodulator (MODEM) (22) is connected to the lines $L_1$, $L_2$ will be considered. The DC resistance from the line to NCU (1) and DTE (2) is set to be greater than the DC resistance of the telephone (3). That is, the line loop current passing through NCU (1) and DTE (2) is less than the current passing through the telephone (3). Thus, when DTE (2) is under operation, the increase of the line loop current caused by the off-hook condition (closing the hook switch HS) of the telephone is detected by the potential between both terminals of the reference resistance (6) using the AD conversion of the analogue-digital converter (7).

In the conventional apparatus, the off-hook operation of the telephone (3) is detected as described. Thus, an AD converter (7) is needed in the exchange center. Moreover, the off-hook condition of the telephone (1) can not be detected by the absolute value of the loop current because of the non-uniformity of the ine impedance. It has been necessary to detect it by the relative increase which causes unreliable operations.

SUMMARY OF THE INVENTION

The present invention is designed to overcome these disadvantages of the conventional apparatus and to provide an apparatus for selecting terminal equipment wherein the telephone current passed during the off-hook condition of a telephone is detected to open the telephone line for a predetermined period. The line impedance in the open state is then detected at the exchange center so as to easily measure the telephone current at the terminal and the telephone is selected.

The telephone current is detected by a photo-coupler which opens a switch in the telephone line. The selection of the telephone by the exchange center is attained by inversion of polarity of the DC voltage applied to the telephone line. The detection of the impedance by the exchange center is carried out by using a reference resistance and an analogue-digital converter.

DETAILED DESCRIPTION OF THE PREFERRED EMBODIMENTS

Figure 1:
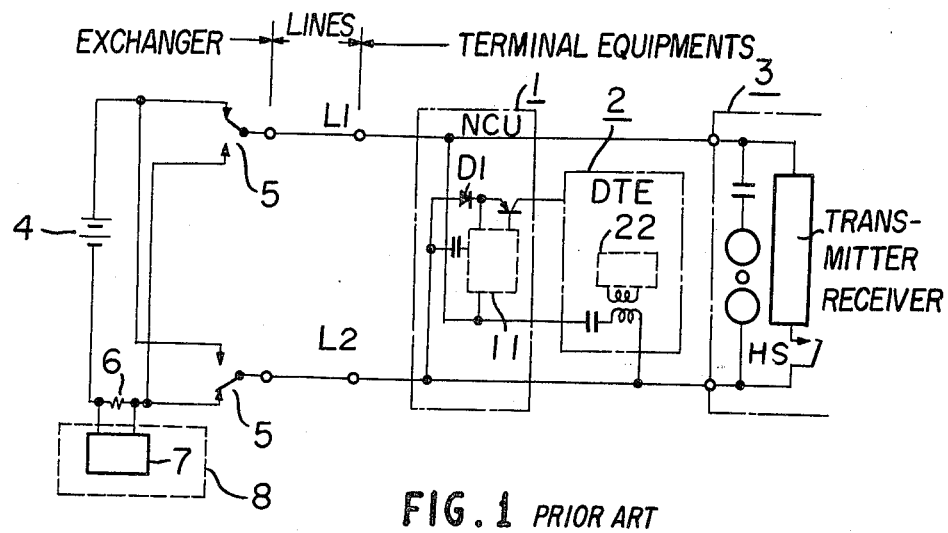
FIG. 1 is a circuit diagram of the conventional apparatus for selecting a terminal equipment in telephone lines.
Figure 2:
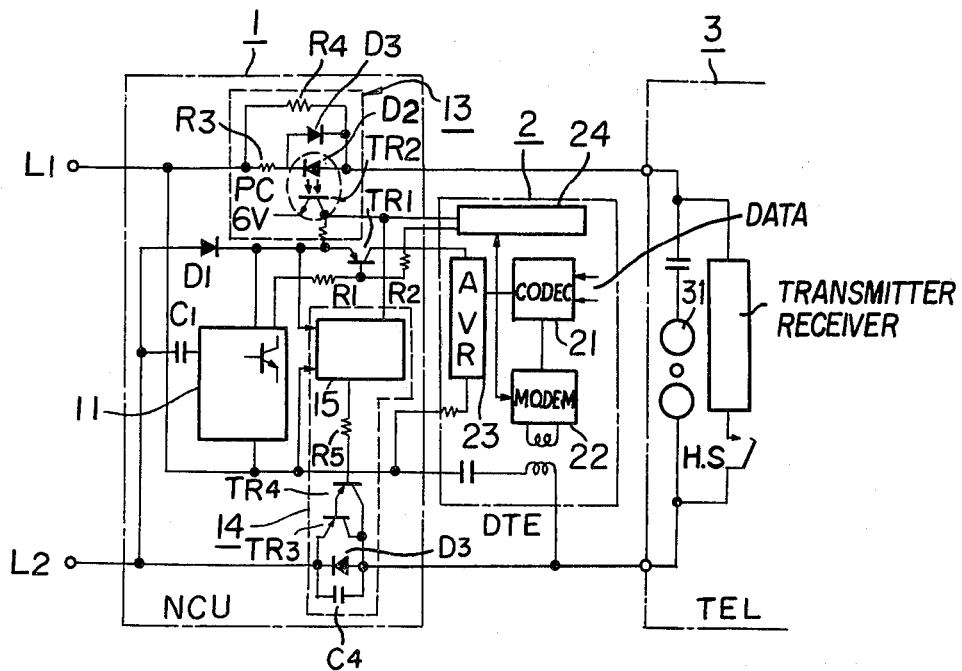
FIG. 2 is a circuit diagram of one embodiment of the present invention.

Referring to FIG. 2, one embodiment of the present invention will be illustrated.

In FIG. 2, the reference numeral (1) designates NCU; (2) designates DTE actuated by NCU (1); (3) designates a telephone (TEL); (11) designates a circuit for detecting NCU actuating signal (detection of calling); (13) designates an off-hook current detection circuit which is serially connected to the telephones (3) to detect the current of the telephone (3) during off-hook; (14) designates an on-hook switch circuit for opening a telephone line during the predetermined period when actuated by the output of the off-hook current detection circuit (13); (21) designates a code decoder circuit (CODEC) for transmitting and receiving data; (22) designates a modulator-demodulator circuit (MODEM); (23) designates a constant voltage circuit (AVR) and (24) designates an initiating circuit.

The operation of the embodiment will be illustrated.

The actuation of DTE (2) is carried out as follows. The diode $D_1$ is turned on by the inversion of the line (plus at $L_2$ side) caused by a call from the exchange center whereby the power source is connected to NCU (1).

The calling signal enters through a coupling capacitor $C_1$ into the calling detection circuit (11). The calling signal is detected by the detection circuit (11) and turns on the transistor in the circuit. Then, the output is fed through the resistor $R_1$ to turn on $TR_1$ whereby the power source is connected to DTE (2). The initializing circuit (24) of DTE (2) performs codec initialization for the transition of the power source and simultaneously, has the function of feeding the base current of the transistor $TR_1$ through the resistor $R_2$. Thus, MODEM (22) is connected to the lines $L_1$, $L_2$ during the feeding of the power of DTE (2), so as to be capable of the transmission and receiving of the data of DTE (2). Initializing circuit (24) may be implemented by means of power-on reset/run circuits of the type disclosed by Clark, "Power-On Reset/Run Circuits for the RCA CDP1802 COSMAC Microprocessor," RCA Application Note ICAN-6581, February 1977, for example by means of the CD 4093 Quad 2-Input NAND gate in circuit connection with an RS flip-flop.

The operation of predominant selection of the telephone (3) over DTE (2) will be illustrated.

When the off-hook condition of the telephone (3) is carried out during the operation of DTE (2), the off-hook current (telephone current) is detected by the off-hook current detection circuit (13) and the on-hook switch circuit (14) is actuated by the detection output. The line loop is opened for a predetermined period by the on-hook switch circuit (14). The line impedance during the open period is detected by the exchange center.

The operation sequence is as follows.

Current is passed through the light emitting diode $D_2$ of the photo-coupler PC during the off-hook condition of the telephone (3), whereby the phototransistor $TR_2$ is turned on to reset the initializing circuit (24) of DTE (2) and the operation of DTE (2) is stopped.

The output of the phototransistor $TR_2$ of the photocoupler PC is also fed to the on-hook cntrol circuit (15) of the on-hook switch circuit (14). The on-hook control circuit (15) feeds the power through the diode $D_1$ during the inversion of the line (plus at $L_2$ side) i.e. the period for actuating DTE (2) and simultaneously, it is initialized to feed the base current to the transistor switches $TR_3$, $TR_4$ through the resistor $R_5$ and the base current is interrupted only for the predetermined period (about 1 to 3 seconds) just after turning on the phototransistor $TR_2$ of the photo-coupler PC. Thus, the transistor switches $TR_3$, $TR_4$ connected in the telephone circuit, are usually in the ON state during the inversion of the line (plus at $L_2$ side) and are turned off only just after the off-hook detection. The telephone line is opened by the turn-off. The line impedance during the opening period is remarkably large whereby the off-hook condition of the telephone (3) can be precisely and easily detected by the exchange center.

The exchange center switches the data line to the telephone line by the detection of the off-hook condition.

The diode $D_3$ connected in parallel to the transistor switches $TR_3$, $TR_4$ is used for passing the line current in the released state of the line polarity (plus at $L_1$ side).

The capacitor $C_4$ of the on-hook switch circuit (14) is used for calling the telephone (3) from the exchange center. The calling signal from an exchange center is the AC signal whereby the bell (31) of the telephone (3) is rung by the calling signal fed through the capacitor $C_4$ regardless of turn-on and off of the transistors $TR_3$, $TR_4$. When the hook switch H·S is closed by holding up the receiver of the telephone (3), the telephone (3) is predominantly selected by the exchange center as described above.

In said embodiment, DTE (2) is connected to NCU (1). Thus, DTE (2) can be any equipment used with a telephone such as a facimile.

In accordance with the present invention, the telephone current passed during the off-hook condition of the telephone is detected and the telephone line is opened for a predetermined period by the detection output and the line impedance during the opening period is detected to form the telephone line. Thus, the off-hook operation of the telephone is precisely and easily detected without any trouble for the operation of the telephone circuit network.

We claim:

1. An apparatus for selectively switching a connection between a telephone and a data transmitter at a terminal of a telephone line, so as to connect one of said telephone and said data transmitter to said telephone line for communication, where the switching is controlled by detecting the line impedance of said telephone line at said terminal by means of an exchange center of said telephone line, wherein the improvement comprises:
   a current detection circuit, including a photocoupler, for detecting the current of said telephone during the operation of said data transmitter;
   a switch circuit for opening said telephone line for a predetermined period of time in response to the output of the current detection circuit;
   a circuit for detecting said line impedance during said predetermined period of time, said circuit being located in said exchange center; and
   means for switching said connection between said telephone and said data transmitter, said means for switching being connected to the output of said circuit for detecting line impedance so as to connect the telephone to the telephone line in response to the output of said circuit for detecting line impedance indicating an off-hook condition of the telephone.

2. An apparatus for selectively switching according to claim 1 wherein said switch circuit is formed by a semiconductor switch device.

3. An apparatus for selectively switching according to claim 1 wherein said means for switching is located in said exchange center to invert DC voltage applied to the telephone line.

4. An apparatus for selectively switching according to claim 1 wherein said circuit for detecting the line impedance comprises a reference resistance and an analogue-digital converter.

* * * * *